US012747913B2

(12) United States Patent
Raynor et al.

(10) Patent No.: US 12,747,913 B2
(45) Date of Patent: Sep. 29, 2026

(54) METHOD TO RETROFIT CAN OVEN OR DRYER

(71) Applicant: Stolle Machinery Company, LLC, Centennial, CO (US)

(72) Inventors: Andrew Peter Raynor, Clitheroe (GB); Andrew Christopher Hyde, Littleton, CO (US)

(73) Assignee: Stolle Machinery Company, LLC, Centennial, CO (US)

( * ) Notice: Subject to any disclaimer, the term of this patent is extended or adjusted under 35 U.S.C. 154(b) by 0 days.

(21) Appl. No.: 19/068,055

(22) Filed: Mar. 3, 2025

(65) Prior Publication Data

US 2025/0277619 A1 Sep. 4, 2025

Related U.S. Application Data

(60) Provisional application No. 63/560,828, filed on Mar. 4, 2024.

(51) Int. Cl.
*F26B 3/04* (2006.01)
*B23P 15/00* (2006.01)
(Continued)

(52) U.S. Cl.
CPC .............. *F26B 3/04* (2013.01); *F26B 21/006* (2013.01); *F26B 21/33* (2026.01); *F26B 23/02* (2013.01); *F26B 23/04* (2013.01); *B23P 15/00* (2013.01); *Y10T 29/49352* (2015.01); *Y10T 29/49716* (2015.01)

(58) Field of Classification Search
CPC .................... Y10T 29/49352; Y10T 29/49716
See application file for complete search history.

(56) References Cited

U.S. PATENT DOCUMENTS

| | | | |
|---|---|---|---|
| 487,872 | A | 12/1892 | Wendell |
| 1,450,027 | A | 3/1923 | England |

(Continued)

FOREIGN PATENT DOCUMENTS

| | | | | |
|---|---|---|---|---|
| CN | 212457818 | U | * | 2/2021 |
| JP | 2012026711 | A | * | 2/2012 |

(Continued)

OTHER PUBLICATIONS

English Machine Translation of JP-2012026711-A (Year: 2012).*

(Continued)

*Primary Examiner* — Sarang Afzali
(74) *Attorney, Agent, or Firm* — Eckert Seamans Cherin & Mellott, LLC

(57) ABSTRACT

A method to retrofit a gas can oven or dryer to make a hybrid can oven or dryer includes moving one or more existing components of the gas can oven or dryer to new positions, removing an existing combustion chamber of the gas can oven or dryer, disconnecting a gas burner of the gas can oven or dryer, installing a new combustion chamber in the gas can oven or dryer, the new combustion chamber accommodating the gas burner and one or more electric heating elements, electrically connecting the one or more electric heating elements, and modifying a control system of the gas can oven or dryer to utilize the gas burner and the at least two electric heating elements.

10 Claims, 3 Drawing Sheets

(51) Int. Cl.

| | |
|---|---|
| ***F26B 21/00*** | (2006.01) |
| ***F26B 21/33*** | (2026.01) |
| ***F26B 23/02*** | (2006.01) |
| ***F26B 23/04*** | (2006.01) |

(56) References Cited

U.S. PATENT DOCUMENTS

| | | | | |
|---|---|---|---|---|
| 2,164,718 | A | 7/1939 | Norman | |
| 3,169,871 | A | 2/1965 | Macchi et al. | |
| 3,685,167 | A | 8/1972 | Loveday et al. | |
| 3,762,067 | A | 10/1973 | Whittaker et al. | |
| 4,268,974 | A | 5/1981 | Price | |
| 4,935,131 | A | 6/1990 | Pindar | |
| 6,279,349 | B1 * | 8/2001 | Schnabel, Jr. | F27D 11/02 65/273 |
| 7,800,023 | B2 | 9/2010 | Burtea et al. | |
| 7,851,727 | B2 | 12/2010 | Burtea et al. | |
| 10,113,795 | B2 | 10/2018 | Hoffman, Jr. et al. | |
| 10,859,315 | B2 | 12/2020 | Mitchell | |
| 11,040,794 | B2 | 6/2021 | Potter et al. | |
| 11,293,693 | B2 | 4/2022 | Shao et al. | |
| 11,633,758 | B2 | 4/2023 | Cochran et al. | |
| 12,050,046 | B2 | 7/2024 | Jung et al. | |
| 12,060,828 | B1 * | 8/2024 | Grainger | F02C 6/04 |
| 2007/0256320 | A1 | 11/2007 | Pearson | |
| 2009/0078176 | A1 | 3/2009 | Weber | |
| 2012/0145693 | A1 | 6/2012 | Deng | |
| 2012/0294595 | A1 | 11/2012 | Veltrop | |
| 2013/0055906 | A1 | 3/2013 | Kanbar et al. | |
| 2015/0114593 | A1 | 4/2015 | Caruncho Rodado | |
| 2015/0125669 | A1 | 5/2015 | Dietrichson et al. | |
| 2016/0023126 | A1 | 1/2016 | Abate et al. | |
| 2016/0046526 | A1 | 2/2016 | Caruncho Rodado | |
| 2019/0381856 | A1 | 12/2019 | Bae et al. | |
| 2019/0381923 | A1 | 12/2019 | Kim et al. | |
| 2020/0023763 | A1 | 1/2020 | Lee et al. | |
| 2020/0031265 | A1 | 1/2020 | Jung et al. | |
| 2020/0223344 | A1 | 7/2020 | Kang et al. | |
| 2020/0224815 | A1 | 7/2020 | Jung et al. | |
| 2023/0051688 | A1 | 2/2023 | Faulkner | |
| 2023/0304737 | A1 | 9/2023 | Parmenter | |
| 2024/0166114 | A1 | 5/2024 | Nam et al. | |

FOREIGN PATENT DOCUMENTS

| | | | | |
|---|---|---|---|---|
| KR | 100921653 | B1 * | 10/2009 | F26B 21/001 |
| WO | 2022237931 | A1 | 11/2022 | |
| WO | 2023227166 | A2 | 11/2023 | |

OTHER PUBLICATIONS

English Machine Translation of KR-100921653-B1 (Year: 2009).*

English Machine Translation of CN-212457818-U (Year: 2021).*

Commissioner for Patents, PCT/ISA, International Search Report and Written Opinion, Jun. 11, 2025, 17 pages.

* cited by examiner

METHOD TO RETROFIT CAN OVEN OR DRYER

CROSS REFERENCE TO RELATED APPLICATIONS

This application claims priority to U.S. Provisional Patent Application Ser. No. 63/560,828, filed Mar. 4, 2024, entitled, System And Method To Retrofit Can Oven Or Dryer.

FIELD OF THE INVENTION

The disclosed concept relates generally to can making, and more particularly to heating systems and method for can dryers or ovens.

BACKGROUND OF THE INVENTION

Metal beverage and food containers (e.g., cans) are mechanically formed using a system of formers and dies. To prevent damage to the products, oils are used to lubricate the surfaces during the forming processes. After the forming process, the oils and other contaminants are washed off the surfaces via a plurality of washing stages. The metal surfaces need to be thoroughly clean and dry before they are sprayed with lacquers and decorated with inks prior to being filled with the food and drink products.

The drying of cans following a typical multi-stage washer will be used as an example. A schematic diagram of a typical drying system is shown in FIG. 1. This process is very energy intensive and this dryer 15 works the hardest in the container making process.

The cans leave the washing process and are presented onto a continuous conveyor 5 that transports the cans through the drying process. The cans entering the dryer 15 have a residual water film that needs to be removed.

The drying process is designed to use high temperature hot air to evaporate the water film to zero before the cans leave the dryer.

Hot air is blown onto the cans via a plenum chamber 1 fitted with nozzles, via a recirculation centrifugal fan 2, and ducts. Natural gas 12 and combustion air 13 are fed into a direct fired gas burner 3 that burns natural gas 12 in a combustion chamber 4. The energy released heats the air flowing around the combustion chamber 4 to a desired operating temperature.

The energy in the hot air is used to raise the temperature of the incoming containers and evaporate the water off the metal surfaces. As the air gives up its thermal energy to the heating and vaporizing process, the air cools. The cooled air is drawn through the conveyor 5 and ducted past the combustion chamber 4 where it is reheated to the desired temperature. The reheated air is then fed into the suction side of a recirculation centrifugal fan 2, completing the recirculation cycle.

The recirculating hot air absorbs water that has vaporized and evaporated from the surface of the metal containers. The water vapor, absorbed into the air, is mixed with the products of the gas combustion.

A portion of the hot recirculating air is drawn off via a damper 6 and the exhaust centrifugal fan 7, which blows the air into an exhaust stack and discharges it to the outside of the building to the atmosphere 8.

Cool fresh air 14 from either inside or outside the building is drawn into the recirculating air stream via a damper 9 to balance the pressures inside the dryer 15. It is important to create a balanced pressure to prevent uncontrolled air infiltrating into the dryer cavity through the can inlet 10 and outlet ports 11, which causes instability. More importantly, balancing the pressures prevent fugitive hot air and contain combustion fumes escaping from the dryer cavity into the operating area where technicians will be working.

The typical drying process is energy intensive and wasteful. There is room for improvement in can drying systems.

SUMMARY OF THE INVENTION

In accordance with an aspect of the disclosed concept, a method to retrofit a gas can oven or dryer to make a hybrid can oven or dryer comprises: moving one or more existing components of the gas can oven or dryer to new positions; removing an existing combustion chamber of the gas can oven or dryer; disconnecting a gas burner of the gas can oven or dryer; installing a new combustion chamber in the gas can oven or dryer, the new combustion chamber accommodating the gas burner and one or more electric heating elements; electrically connecting the one or more electric heating elements; and modifying a control system of the gas can oven or dryer to utilize the gas burner and the at least two electric heating elements.

In accordance with another aspect of the disclosed concept, a kit for retrofitting a gas can oven or dryer to make a hybrid can oven or dryer comprises: a combustion chamber structured to accommodate a gas burner and one or more electric heating elements, the combustion chamber having a recirculation opening and an input opening; and transition ducting having a first end having a shape corresponding to the input opening of the combustion chamber and a second end having a shape corresponding to an opening of the gas can oven or dryer, the transition ducting structured to couple the combustion chamber to the opening of the gas can oven or dryer.

In accordance with another aspect of the disclosed concept, a combustion chamber for retrofitting a gas can oven or dryer to make a hybrid can oven or dryer comprises: a housing substantially enclosing a combustion area; a first opening in a side of the housing structured to receive a gas burner in the combustion area; a second opening in the side of the housing structured to receive one or more electric heating elements in the combustion area; a recirculation opening in the housing structured to couple to a recirculation fan of the gas can oven or dryer; and an input opening structured to couple to a cavity of the gas can oven or dryer.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
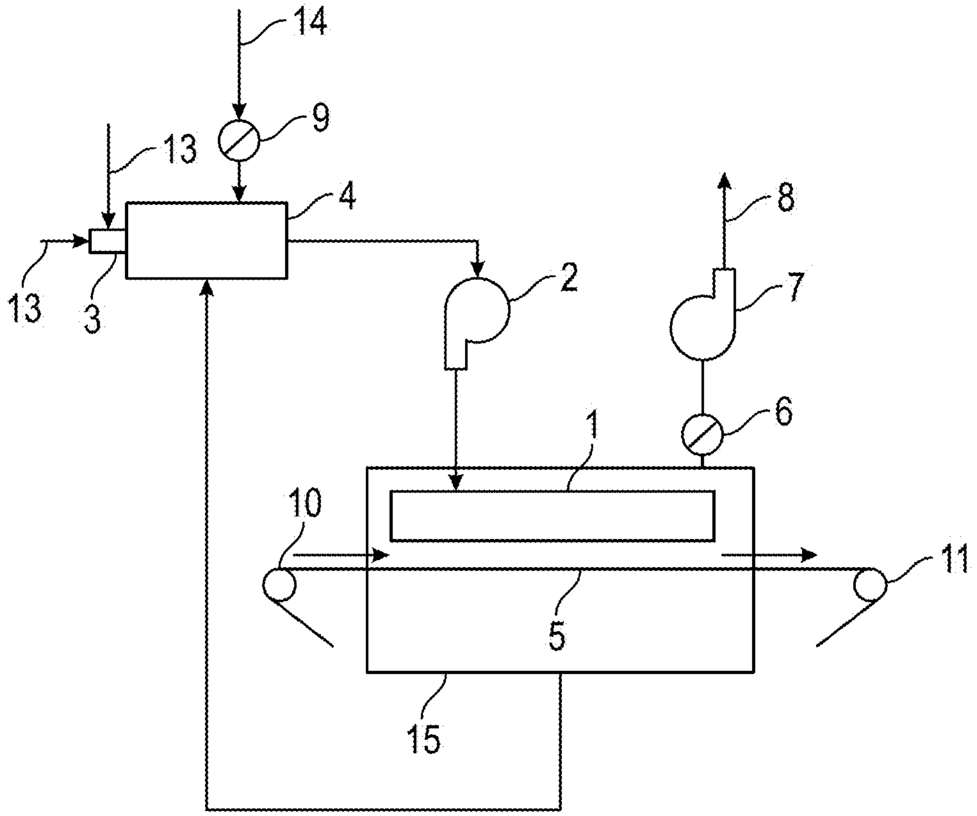
FIG. 1 is a schematic diagram of a typical can drying system.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

A major cost in the rapid drying of any product, is the sustainable source and cost of the energy used.

Electrical power is rapidly being considered as a sustainable energy source and is increasingly being generated using wave, wind, solar, hydro and nuclear primary sources. To ensure that optimization of resources, an example embodiment of the disclosed concept allows modification or retrofitting of a can dryer or oven that uses natural gas for heating to a hybrid can oven or dryer that uses natural gas and electricity as the source of energy to heat air to a temperature to dry metal beverage cans. In accordance with some example embodiments, a combustion chamber assembly suitable for retrofitting a gas can dryer or oven to make it a hybrid can dryer or oven is provided.

Figure 2:
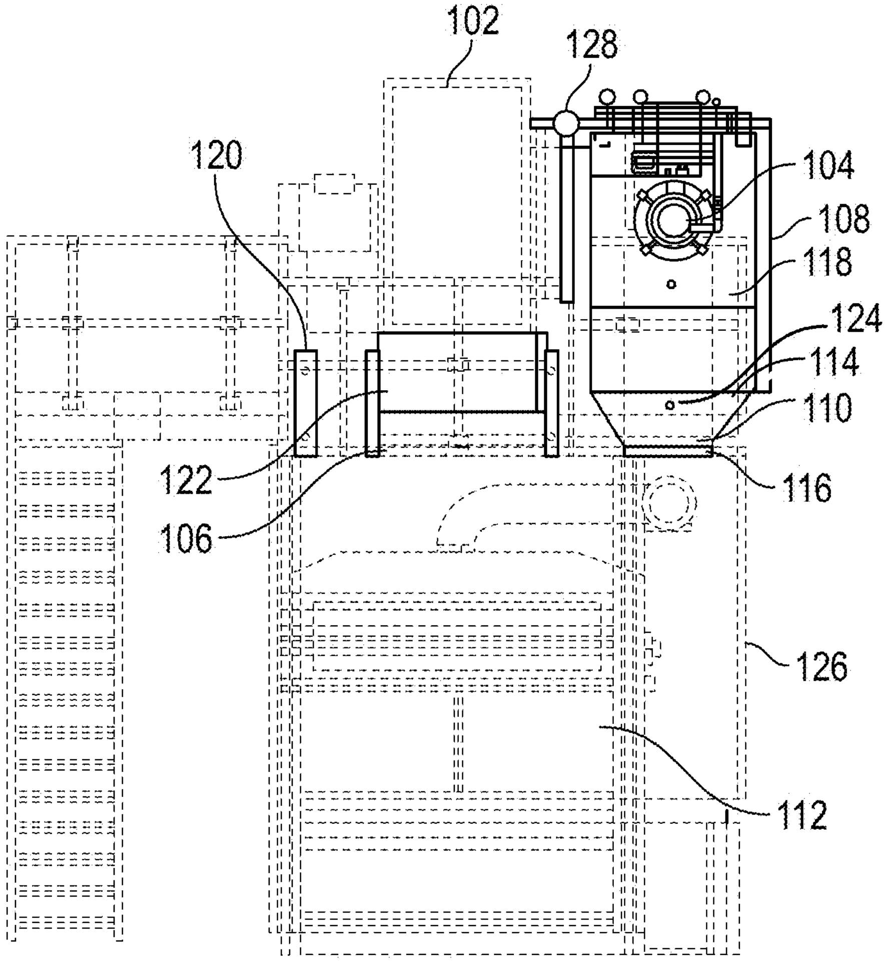
FIG. 2 is a view of a can drying system retrofitted in accordance with an example embodiment of the disclosed concept.
Figure 3:
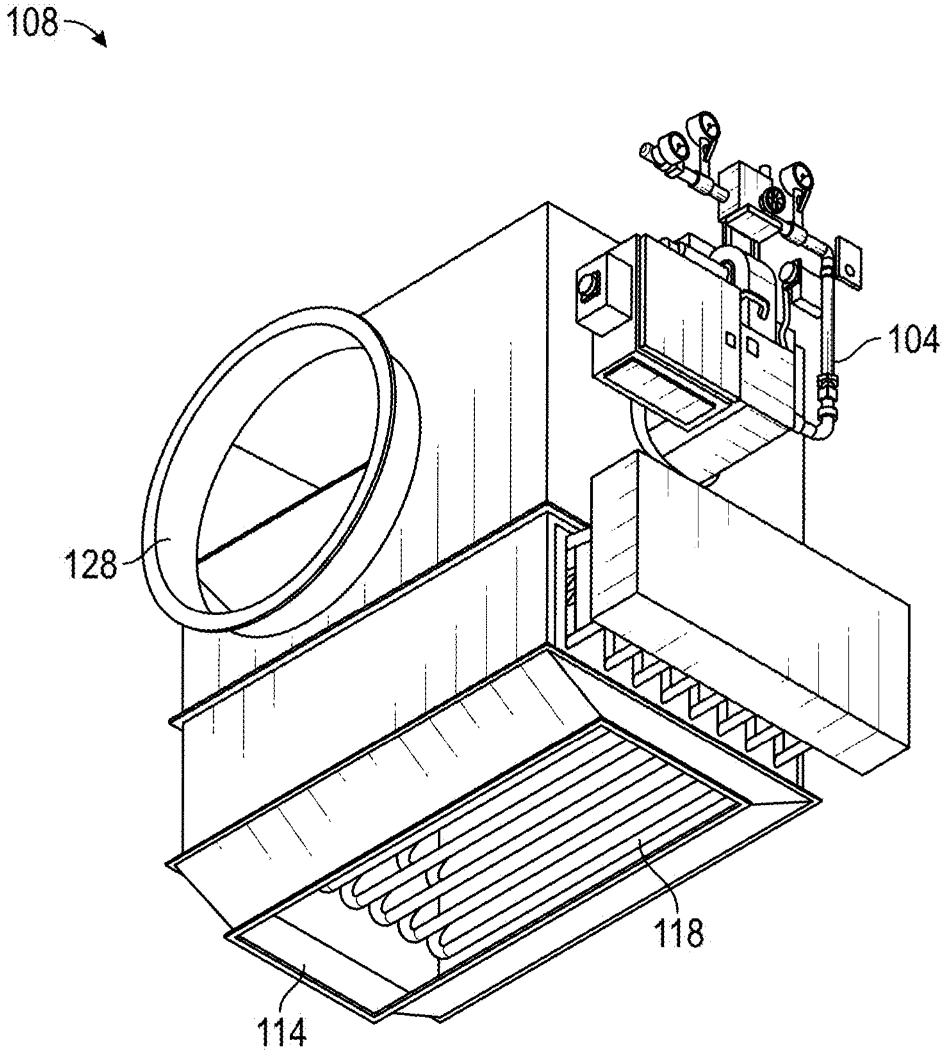
FIG. 3 is a view of a combustion chamber in accordance with an example embodiment of the disclosed concept.

FIG. 2 is a view of a gas can dryer retrofitted in accordance with an example embodiment of the disclosed concept to be a hybrid can dryer. FIG. 3 is a view of a combustion chamber 108 used to retrofit a gas can oven or dryer to be a hybrid can oven or dryer.

In accordance with an example embodiment of the disclosed concept, an existing gas can oven or dryer includes a recirculation fan 102, a gas burner 104, flexible ductwork 106 connecting the recirculation fan 102 to a can oven or dryer cavity 112, a combustion chamber, as well as various other components. Retrofitting the existing can oven or dryer in accordance with an example embodiment of the disclosed concept involves utilizing the existing recirculation fan 102, gas burner 104, and flexible ductwork 106. The existing combustion chamber is removed and replaced with a new combustion chamber 108 such as that shown in FIG. 3. New transition ducting 110 is also added to facilitate connection of the combustion chamber 108 to the can oven or dryer cavity 112. For example, the transition ducting 110 may have a length corresponding to a distance between an input opening 114 of the combustion chamber 108 and an opening 116 of the can oven or dryer cavity 112. The transition ducting 110 may also have one end having a size and shape corresponding to the input opening 114 of the combustion chamber 108 and a second end having a size and shape corresponding to the input opening 116 of the dryer or oven cavity 112. Electric heating elements 118 are also installed into the new combustion chamber 108. In some example embodiments, fan support framework 120 and fan discharge ductwork 122 may also be added to couple the recirculation fan 102 to the flexible ductwork 106. For example, if the recirculation fan 102 must be raised to connect to the new combustion chamber 108 and the existing flexible ductwork 106 cannot expand to the length needed to connect to the new location of the recirculation fan 102, fan discharge ductwork 122 and any necessary fan support framework 120 to support the fan discharge ductwork 122 may be employed. However, it will be appreciated that the fan discharge ductwork 122 and the fan support framework 120 may be omitted in applications where they are not needed.

A combustion chamber 108 in accordance with an example embodiment of the disclosed concept is shown in FIG. 3. The combustion chamber 108 is structured to allow the existing gas burner 104 to be connected to the combustion chamber 108 to heat air inside the combustion chamber 108. The combustion chamber 108 is also structured to allow electric heating elements 118 to be coupled to the combustion chamber so that the electric heating elements 118 are disposed within the combustion chamber 108 and can heat the air within the combustion chamber 108. The combustion chamber 108 is sized to allow for maximum air flow across the electric heating elements 118 while maintaining volumetric requirements for circulation. The combustion chamber 108 also provides a minimized pressure drop. A differential pressure monitoring system may be utilized with the combustion chamber 108 to monitor for early blockage detection, such as if airflow becomes blocked or if the electric heating elements 118 become dirty and impede airflow.

The combustion chamber 108 includes a housing substantially enclosing a combustion area. A first opening disposed in a side of the housing is structured to receive a gas burner in the combustion area. A second opening in the side of the housing is structured to receive at least two electric heating elements 118 in the combustion area. The housing also includes a recirculation opening 128 structured to couple to the recirculation fan 102. The housing further includes the input opening 114 structured to couple to the can oven or dryer cavity 112 via the transition ducting 110.

In some example embodiments, the electric heating elements 118 are a 350 kW assembly. In some example embodiments, the electric heating elements 118 are a 450 kW. However, it will be appreciated that different powers of heating elements may be employed without departing from the scope of the disclosed concept. In some example embodiments, the electric heating elements 118 are divided into two independently controllable units. However, it will be appreciated that the electric heating elements 118 may be divided into a different number of independently controllable units, or used as a single unit, without departing from the scope of the disclosed concept.

A new heater control panel 126 may also be provided as part of the retrofit. The new heater control panel 126 may include thyristor, or other types of controls, for controlling the electric heating elements 118. The heater control panel 126 may also include interconnections structured to connect the heater control panel 126 to the main control unit for the oven or dryer.

In accordance with an example embodiment of the disclosed concept, a method of retrofitting a gas can oven or dryer to be a hybrid can oven or dryer includes, first, moving existing components to their new required positions. Second, removing the existing combustion chamber. Third, disconnecting the gas burner 104. Fourth, installing the new combustion chamber 108. Fifth, electrically connecting new components. Sixth, installing a moisture sensor in the discharge stack. Seventh, modifying the control system.

In accordance with an example embodiment of the disclosed concept, retrofitting the can oven or dryer includes modifying the control system to utilize the addition of the electric heating elements 118. A can oven or dryer has three main heating cycles. One cycle is a cold start. The cold start includes heating the air inside the oven or dryer from ambient temperature to 320° F. The heat up time from a cold start is about 30 minutes and is the highest load consuming heat up time. Another heating cycle is a standby start. During normal operation, an oven will reduce to a standby temperature when there is no product running through the machine. The standby temperature is typically about 250° F. When product is again running through the machine, there is usually a period of about 10 minutes to achieve the normal running temperature of 320° F. The standby start is the second highest load requirement for the heating curve. Another heating cycle is maintaining temperature. When the oven is at a desired temperature, the temperature needs to be maintained as product passes through the oven. This maintenance consumes load and in turn heat needs to be replaced within the oven. Maintaining temperature is the least load requirement for the required heating curve.

The control system of the retrofitted can oven or dryer is modified to utilize both the gas burner 104 and electric heating elements 118. The control system receives input from temperature sensors in the heating chamber. The control system is structured to receive a temperature set point, for example a target temperature and a time to reach the target temperature. The control system is structured to determine the required heat input to achieve the temperature set point. The control system is structured to determine the percentage output the heating system should provide to meet the required heat input to reach the temperature set point. The percentage output of the heating system can vary from 0-100%. The control system is structured to operate the heating system in different manners depending on the determined percentage output that is necessary. For example, from 0-50% output, the control system will utilize one of two electric heating elements. From 50-75% output, the control system will utilize both electric heating elements. From 75-100% output, the control system will utilize both electric heating elements and the gas burner. That is, when most heating output is needed, the control system will utilize all available heating elements. When less heating output is needed, the control system will favor just using electric heating elements rather than the gas burner. The gain will be calculated to suit the heat up time required to ensure maximum efficiency in the controls applied.

The control system may also be structured to adjust controls of other elements of the retrofitted can oven or dryer. For example, when the gas burner 104 is not being utilized, the combustion air usually required for operation of the gas burner can be deducted from the air flow required to be generated by the exhaust fan. Accordingly, the control system may be configured to slow down the exhaust fan when the gas burner 104 is not being operated.

The retrofitted can oven or dryer may also include a differential pressure sensor 124 to monitor the air pressure created through the combustion chamber 108. Air flow can be calculated from the air pressure and used to monitor the speed of the exhaust fan and also detect blockages across the electric heating elements 118. The sensed air pressure can be used to alert operators that cleaning is required and can be used to optimize the speed and energy usage of the exhaust fan.

The retrofitted can oven or dryer may also include a moisture sensor in the exhaust stack. The moisture sensor may be used to optimize the circulation pressure in the oven or dryer. The circulation pressure may be optimized by lowering the flow rates to the lowest possible speed set points, which are most efficient, while maintaining good levels of moisture removal from the oven or dryer.

The retrofitted can oven or dryer may also include gas and power monitors to monitor the usage of gas and power. These readings may be used to optimize the balance between usage and the gas burner and electric heating elements to ensure a maximum balance of speed versus efficiency in various applications.

It will be appreciated that the disclosed concept contemplates a method for retrofitting a gas can oven or dryer to make it a hybrid can oven or dryer. The disclosed concept also contemplates a retrofit kit for retrofitting a gas can oven or dryer to make it a hybrid can oven or dryer. The kit may include the combustion chamber 108, transition ducting 110, interconnections for electrical connection, as well as any other components for installing and operating the combustion chamber 108 such as, for example and without limitation, the fan discharge ductwork 122, the fan support framework 120, the heater control panel 126, a moisture sensor for the discharge stack, and any other components. The disclosed concept further contemplates a system and method of controlling a retrofitted can oven or dryer. The disclosed concept further contemplates a combustion chamber for retrofitting a can oven or dryer.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A method to retrofit a gas can oven or dryer to make a hybrid can oven or dryer, the method comprising:

moving one or more existing components of the gas can oven or dryer to new positions;

removing an existing combustion chamber of the gas can oven or dryer;

disconnecting a gas burner of the gas can oven or dryer;

installing a new combustion chamber in the gas can oven or dryer, the new combustion chamber accommodating the gas burner and one or more electric heating elements;

connecting the gas burner;

electrically connecting the one or more electric heating elements; and modifying a control system of the gas can oven or dryer to utilize the gas burner and the one or more electric heating elements.

2. The method of claim 1, further comprising:

installing a moisture sensor in a discharge stack of the gas can oven or dryer.

3. The method of claim 1, wherein the new combustion chamber includes:

a housing enclosing a combustion area;

a first opening in a side of the housing structured to receive the gas burner in the combustion area; and a second opening in the side of the housing structured to receive the one or more electric heating elements in the combustion area.

4. The method of claim 3, wherein the new combustion chamber includes:

a recirculation opening in the housing structured to receive air in the combustion area; and an input opening structured to couple to a cavity of the gas can oven or dryer.

5. The method of claim 4, further comprising:

providing transition ducting; and coupling the input opening of the new combustion chamber to the cavity of the gas can oven or dryer with the transition ducting.

6. The method of claim 5, wherein a first end of the transition ducting has a size and shape corresponding to the input opening of the new combustion chamber and a second end of the transition ducting has a size and shape corresponding to an input opening of the cavity of the gas can oven or dryer, and wherein the sizes of the first and second ends of the transition ducting are different.

7. The method of claim 1, wherein the one or more existing components of the gas can oven or dryer includes a recirculation fan and flexible ductwork, and wherein the method further comprises:

moving the recirculation fan to a new position;

providing fan discharge ductwork; and using the fan discharge ductwork to connect the recirculation fan to the flexible ductwork.

8. The method of claim 7, further comprising:

providing fan support framework to support the fan discharge ductwork.

9. The method of claim 1, wherein the one or more electric heating elements includes at least two electric heating elements.

10. The method of claim 1, wherein the one or more electric heating elements is a 350 kW assembly or a 450 kW assembly.

* * * * *